United States Patent [19]

Rex

[11] 4,137,720
[45] Feb. 6, 1979

[54] USE OF CALCIUM HALIDE-WATER AS A HEAT EXTRACTION MEDIUM FOR ENERGY RECOVERY FROM HOT ROCK SYSTEMS

[76] Inventor: Robert W. Rex, 2780 Casalero Dr., La Habra, Calif. 90631

[21] Appl. No.: 778,441

[22] Filed: Mar. 17, 1977

[51] Int. Cl.² .............................................. F03G 7/04
[52] U.S. Cl. ........................................ 60/641; 252/67; 165/45; 299/5; 60/651
[58] Field of Search .................... 60/641, 648; 165/45; 252/67; 299/4, 5

[56] References Cited

U.S. PATENT DOCUMENTS

| | | | |
|---|---|---|---|
| 874,907 | 12/1907 | Frasch | 299/5 |
| 2,161,800 | 6/1939 | Cross | 299/5 |
| 2,896,930 | 7/1959 | Menke | 299/5 |
| 3,437,451 | 4/1969 | Every et al. | 299/5 |
| 3,574,599 | 4/1971 | Ortloff et al. | 299/4 |
| 3,676,078 | 7/1972 | Jacoby | 299/5 X |
| 3,792,902 | 2/1974 | Towell et al. | 299/5 |

Primary Examiner—Allen M. Ostrager
Assistant Examiner—Stephen F. Husar
Attorney, Agent, or Firm—Kenyon & Kenyon, Reilly, Carr & Chapin

[57] ABSTRACT

In order to extract energy in a matter more efficient than is presently known to the art, from hot dry rock geothermal systems, a mixture of water and calcium chloride is used. The fluid mixture is injected into a formation and forced through the formation with simultaneous extraction of heat from the energy recovery or heat extraction surrounding rocks. The fluid and a larger fraction of its contained energy are then recovered than can presently be recovered by technology known to the art.

10 Claims, 1 Drawing Figure

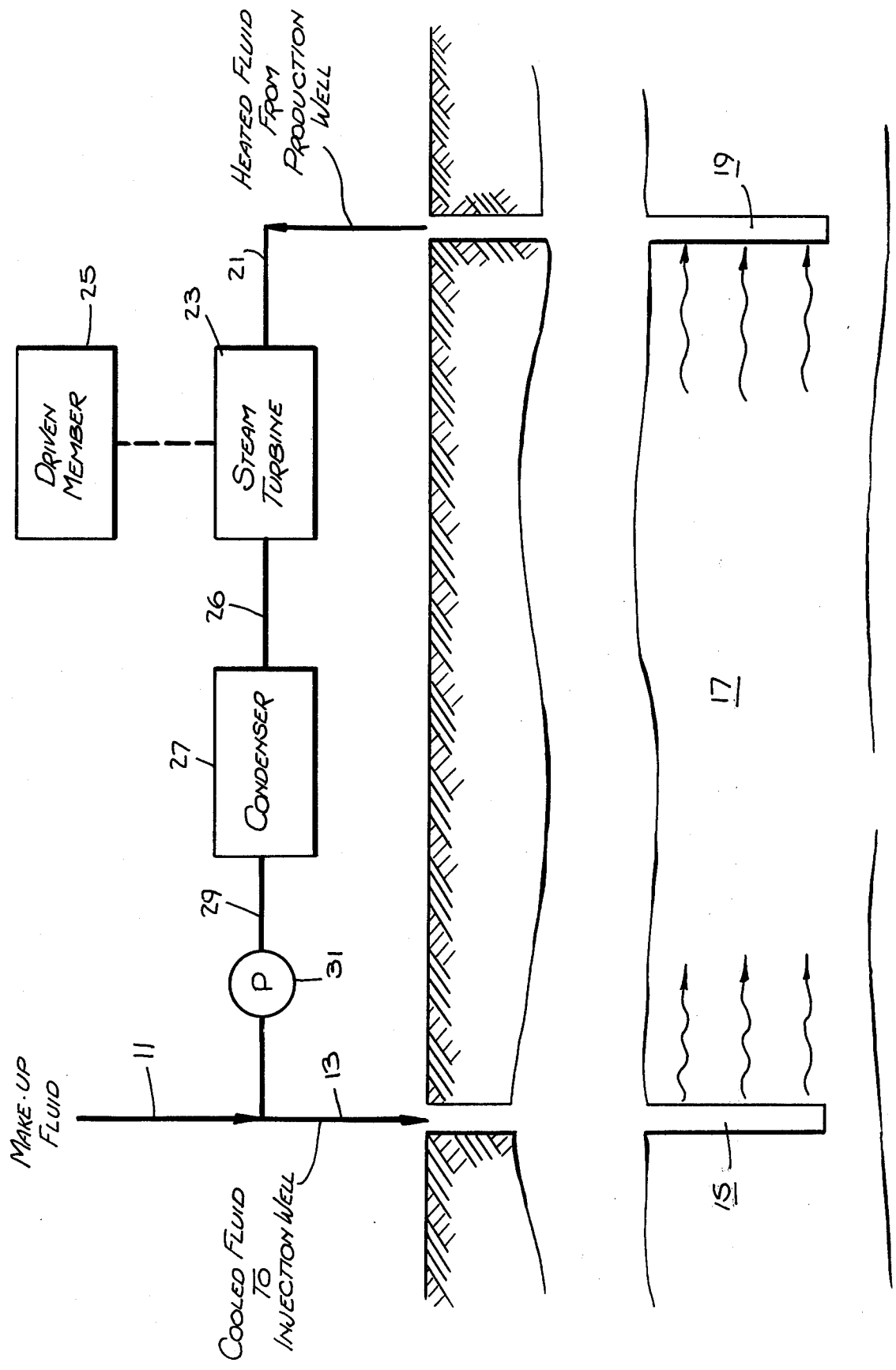

USE OF CALCIUM HALIDE-WATER AS A HEAT EXTRACTION MEDIUM FOR ENERGY RECOVERY FROM HOT ROCK SYSTEMS

BACKGROUND OF THE INVENTION

This invention relates to geothermal energy in general and more particularly to an improved method of extracting geothermal energy in a hot, dry rock system.

With the shortage of petroleum products and high prices, there is great deal of interest in alternate sources of energy. One such source is geothermal energy. This energy is energy taken from the natural heat of the earth. Various systems have been developed for such purposes. Typical are those disclosed in U.S. Pat. Nos. 3,817,038, 3,786,868 and 3,911,638. In a hot dry rock system such as that disclosed in U.S. Pat. No. 3,817,038, an injection well and a production well are drilled and a fluid is injected into a geothermal area through the injection well, the fluid forced through the formation with simultaneous heating and the heated fluid then recovered from the production well. The recovered heated fluid is then used on the surface to generate energy. For example, the heated fluid may be expanded to steam and used to drive a steam turbine, the condensate from the steam turbine along with any makeup water then being reinjected in the injection well to form a closed system.

Another approach similar to the one in which two wells are drilled is one in which a single well is completed with a dual casing string which permits injection of cold water at the bottom of the fracture system and recovery of hot water at the top of the fracture. A third approach, which is known as "huff and puff", is one in which the well is operated in a pulsed mode where water is alternately pumped into the fracture, allowed to heat up and then withdrawn. Operation of several wells of this type in sequence provides power for sustained operation. The pulsed mode operation has the additional virtue of permitting use for load following applications, i.e., for driving a generator which follows the electrical demand load, pulsing can be controlled in dependence on the demand.

Injection and production of water requires energy and any approach which diminishes the reinjection or production energy required, diminishes the cost of producing geothermal energy from this resource and increases the net amount of energy recovered from the resource reducing waste and increasing the net reserves of energy indigenous to the United States.

SUMMARY OF THE INVENTION

The present invention has as its object improving the efficiency of energy removal from hot rock geothermal systems.

In accordance with the present invention, heat extraction from hot rock systems is accomplished in an advantageous manner by employing as a energy recovery fluid, a mixture of water and a calcium halide. In particular calcium chloride and calcium bromide may be used either separately or together. Calcium chloride has the ability to raise the specific gravity of the inflowing brine to the geothermal system to about 1.4 to 1.5 while the hot return brine will have specific gravities of only 1.0 or slightly less depending upon the termperature, pressure and content of water and any additional additives. Calcium bromide acts in similar fashion. As a result, a pressure gradient is developed which drives the circulation of the heat extracting fluid. In the pulsed mode case, the use of such a mixture serves to substantially reduce the amount of energy required to reject and recover the heat extraction fluid and as an additional benefit, reduces the energy required to fracture the hot rock, which is desirable, in that fractioning further increases heat recovery and efficiency by increasing the rock surface area available for heat transfer. The addition of a calcium halide to the energy recovery fluid of a hot dry rock geothermal energy recovery system, either the pulse or continuous injection/projection mode increases net system energy output by reducing the energy required for injecting the energy recovery fluid to the heat bearing formation due to the increased density imparted to the energy recovery fluid by the additive. Calcium halide additions further reduce the energy required for transporting the energy recovery fluid from the heat-bearing underground rock formation to the ground surface by virture of the reduced density imparted by the additive fluid while at elevated temperatures.

Other materials may be added to the energy recovery fluid for other purposes. In particular materials having a high vapor pressure are helpful. An example of such a material is acetone. These materials serve to increase the hydraulic pressure of the hot fluid. In the pulse mode of heat extraction this increased pressure helps with growth of additional rock fractures that serve to provide more heat and the pressure also assists in driving the hot fluid back out of the well where it can be utilized. Acetone also reduces the ability of the mixture to dissolve minerals and diminish the suspension of colloidal solids thereby reducing the tendency of wells to scale, allowing more continuity in the recovery of energy and enhancing the economic desirability of what may have previously been considered uneconomic sources of energy. The use of acetone mixed with water for use as a fluid in such a system is described in applicant's copending Ser. No. 778,388 filed on even date herewith and entitled Improved Method for Energy Extraction From Hot Dry Rock Systems.

BRIEF DESCRIPTION OF THE DRAWING

The single FIGURE illustrates the type of system in which the heat extraction fluid of the present invention may be used.

DETAILED DESCRIPTION OF THE INVENTION

In accordance with the present invention, in a hot rock geothermal system, for example, a system such as that shown in the aforementioned U.S. Pat. No. 3,817,038, a mixture of water and calcium chloride and/or calcium bromide is used as the heat extraction or energy recovery fluid. Such a system is shown in basic block diagram form on the FIGURE. Shown is a closed loop system containing the heat extraction fluid of the present invention. Fluid is initially supplied to the system and made up over a line 11. The line 11 connects with a line 13 which is the input to an injection well 15. The injection well is drilled down to the depth of the hot rock system and is collected in a production well 19. The output from the production well 19, which will be the fluid heated by the hot dry rock system 17, flows in a line 21 to a steam turbine 23 where it is expanded. The turbine is used to drive a driven member 25 such as a generator. The working fluid from the steam turbine, in the form of a vapor is exhausted over a line 25 to a condenser 27 where it is brought back into the liquid state. This liquid then flows through a line 29 to a pump 31 which pumps it back into the injection well 15. As noted above, the use of a closed loop with a condenser conserves the working fluid. Whatever losses are encountered can be made up by supplying make up fluid over the line 11. Preferably, this mixture also has added to it acetone. Calcium chloride is added in an amount to raise the specific gravity of the heat extraction fluid supplied into the well, for example, in an injection well, to 1.4 to 1.5 at a temperature of approximately 20° C. After injection into the well, due to a subsequent heating which takes place in the hot rock system, the specific gravity is reduced to 1.0 or slightly less depending on the amounts of the various materials present. This then results in a pressure gradient which aids in circulation of the heat extraction fluid through the well. Acetone will normally constitute 10 to 20% by weight of the heat extraction fluid. Calcium chloride and/or calcium bromide will constitute 1 to 50% of the heat extraction fluid with the remainder water, i.e., calcium halide can be added up to its limit of solubility.

The heat extraction fluid ideal high vapor pressure additive most useful in the pulse mode of heat extraction depends on the climatic conditions at the generating site. For cases such as the Imperial Valley, when $130\pm°$ F is the normal summer cooling water temperature, then the additive should have an atmospheric pressure boiling temperature below water ($212\pm°$ F) but above 130° F so that it will be condensable with a water cooling system. Acetone appears to be the superior substance for these purposes, having a boiling point of 133.7° F. If lower heat rejection temperatures are feasible, other additives are possible. In general, compounds soluble in water are superior. These include methanol, ethanol, isopropanol, acetone, and dioxane. Actually, methane, ethane, propane, butane, isobutane, and methyl ethyl ketone have sufficient water solubility at high temperatures that they serve under special conditions as usable compounds. Ammonia in water is also a useable material subject to assurance of an economically acceptable low from the heat extraction fluid loss by ion exchange with the heat source host rocks.

Furthermore, additional materials can be added to the heat extraction fluid mixture forming various admixtures to accomplish secondary functions which will not depart from the scope of this invention. Includes among these are additional organic liquids to change the thermodynamic properties of the heat extraciton fluid and complexing agents to complex and extract materials of economic interest. Those skilled in the art will see many modifications and applications of the method herein described without departing from the scope of this invention.

An example of a group of compounds which could have limited application are the amines. Low molecular weight amines such as tri-methyl amine could serve directly as a heat extraction medium while higher molecular weight amines either as ionized salts or as undissociated species are usable to condition the rock surfaces to change wetability; to reduce ion exchange between the heat extraction fluid and the rocks; and to serve as corrosion inhibitors for equipment installed in the well system.

As a secondary function, also the solution used as a heat extraction fluid can be used to leach the hot rock of desired metals without departing from the scope of this invention. Typical complexing agents range from compounds such as acetylacetonate to complex chelating agents. Others include mild oxidants such as ferric chloride and many others. The heat of the rock provides a considerable increase in ion exchange and reaction rates compared to ordinary leaching which takes place at or near surface temperatures. The addition of the aforementioned ferric chloride or other mild oxidant can be used to liberate metal sulphides and convert the sulphur to sulphate which would be left in the hot rock as calcium sulphate while the metal chloride stays in solution.

The use of calcium chloride, water, and acetone as a heat extraction fluid gives rise to a number of phenomena that may to some degree cause problems if not handled correctly and also produce certain benefits if handled properly.

The presence of concentrated calcium ion solutions will induce ion exchange with framework and layer silicate minerals such as feldspars and micas respectively. This has the effect of converting calcium chloride to sodium and potassium chloride. However, the use of acetone suppresses the solubility of sodium and potassium chloride so these may tend to precipitate out on the surface of the fractures and potentially cause some blockage. Occasional flushing with acetone-free or low acetone calcium chloride will serve to dissolve these salts which can then be recovered from the wash solution. One technique known to the art of a solution mining of underground salt deposits for selective potassium chloride recovery is to cool the brine. Potassium chloride will selectively precipitate and the sodium chloride stay in solution. This can be recovered either by evaporation concentration or, if acetone is present, by addition of more acetone which will salt out the sodium chloride.

Alternatively, other techniques known to the art of solution mining consist of operation in a reducing environment can permit the use of complexing agents that would be unstable in an atmospheric environment. An example of such an agent is the polysulphide ion or the bisulphide ion which acts to solubilize metal sulphide minerals. Once the minerals which are desired to be extracted are dissolved in the brine, they can be extracted using conventional techniques ranging from temperature and pressure change, pH adjustment, hydrogen reduction, ion exchange, precipitation by sulphide ions, concentration by evaporation and selected solvent extraction without departing from the scope of this invention.

The wash water above as well as the normal calcium chloride brine used as a heat extraction fluid is a potential feedstock for chemicals recovery by a number of different means. The selective ion exchange of calcium for potassium and potassium recovery by cooling has been noted. The process of converting calcium chloride to potassium chloride also causes an enrichment of bromide in the calcium chloride heat extraction fluid and occasional processing through an extraction loop involving oxydation with elemental chlorine followed by absorption provides a means of bromine recovery.

Lithium builds up in the calcium chloride heat extraction fluid as a consequence of ion exchange and is also a potentially valuable product which may be recovered by pH increase effected by carbonation.

Silica dissolves in the heat extraction fluid at high temperatures and precipitates out at low temperatures. This provides a means of producing a high surface area amorphous, hydrated highly reactive silica usable as a feedstock for producing sodium metasilicate and related compounds as well as an absorptive carrier for other materials such as water and insecticides. This material is usable, when dry, as a filler in plastics and elastomers. This process of processing the brine by cooling so as to precipitate the silica, serves to scavenge colloidal materials such as metal sulfides. This is a direct means of recovering gold, silver, and copper. The technique involves collecting the silica precipitate either in a settling pond, baffle device, or fluidized bed followed by crushing, roasting in air to oxydize the sulfide in the precipitate followed by leaching with solubilizing chemicals. These include either alkaline cyanide solutions or dilute nitric acid solutions.

As noted above, the present invention relates to a type of geothermal system which is known as a dry, hot rock system. There is another type of geothermal system known as a hydrothermal brine system. These are wet systems in which heat is recovered from hot naturally existing brine. These brines sometimes contain large amount of calcium chloride and in operating such hydrothermal wells, calcium chloride is obtained as a by-product during solar evaporation of the brines. The present invention provides a use for this by-product of hydrothermal wells, i.e., introducing the calcium chloride into a hot dry rock system to recover thermal energy therefrom, thereby enhancing the economics of hydrothermal energy reserves.

In summary, the present invention in one aspect comprises mixing calcium chloride with water to form a heat extraction fluid more efficient than those presently known to the art of hot dry rock geothermal wells which will produce an increased pressure gradient and reduce the amount of energy needed to operate the well thereby improving the thermal efficiency and economic viability of the hot dry rock energy recovery systems. Furthermore, various chemical agents have been noted which are known to the art of solution mining can be added to the disclosed heat extraction mixture to perform various functions and further improve the economic efficiency of the operation without departing from the scope of this invention. Finally, the manner in which the present invention permits using a by-product of hydrothermal systems as differentiated from hot dry rock systems to reduce the cost of energy extraction from hydrothermal systems has been described.

I claim:

1. An improved heat extraction fluid for use in hot, dry rock geothermal systems comprising a brine mixture of water and a calcium halide, said mixture having a specific gravity of approximately 1.4 to 1.5 when at a temperature of approximately 20° C., whereby when said brine is injected to and heated by the hot, dry rock formation its specific gravity will be reduced to approximately 1.0 resulting in a more energy efficient pressure gradient in the geothermal system.

2. The heat extraction fluid of claim 1 wherein said calcium halide is selected from the group consisting of calcium chloride calcium bromide and a mixture of calcium chloride and calcium bromide.

3. The heat extraction fluid of claim 2 wherein said fluid contains approximately 1 to 50% of a calcium halide by weight, 10 to 20% acetone by weight and the remainder water.

4. The heat extraction fluid of claim 2 which further includes a ketone mixed with said fluid.

5. The heat extraction fluid of claim 4 wherein said ketone is acetone.

6. The use of the heat extraction fluid of claim 4 in a pulse mode of heat extraction.

7. A method of operating geothermal well which includes the steps of introducing a fluid medium into a hot rock system, said fluid medium including a mixture of water and calcium chloride, and recovering useful energy from the resulting heated fluid medium from said well.

8. The method according to claim 7 wherein said heat extraction fluid contains approximately 1 to 50% calcium chloride by weight, 10 to 20% acetone by weight and the remainder water.

9. The method of claim 7 wherein said fluid medium is introduced in a pulse mode of heat extraction and further including adding a high vapor pressure additive to said fluid medium to reduce operational energy consumption.

10. The method of claim 9 wherein said additive is selected from the group consisting of methane, ethane isopropanol, acetone, dioxane, methyl ketone and ammonia.

* * * * *